(12) United States Patent
Kolacz et al.

(10) Patent No.: US 6,305,621 B1
(45) Date of Patent: Oct. 23, 2001

(54) PIVOTING FLUID CONDUIT JOINT AND ONE-WAY BRAKE

(75) Inventors: David J. Kolacz, Plymouth; Ross Mack, Valparaiso; Robert W. Steingass, Valparaiso; Brian M. Tylisz, Valparaiso, all of IN (US)

(73) Assignee: Task Force Tips, Inc., Valparaiso, IN (US)

(*) Notice: Subject to any disclaimer, the term of this patent is extended or adjusted under 35 U.S.C. 154(b) by 0 days.

(21) Appl. No.: 09/516,076

(22) Filed: Mar. 1, 2000

(51) Int. Cl.$^7$ .................................................. B05B 15/08
(52) U.S. Cl. ............................ 239/587.2; 239/587.4; 239/587.6; 239/588; 169/24
(58) Field of Search ................ 239/587.1–587.6, 239/588; 169/24, 25, 52; 285/261–267, 185

(56) References Cited

U.S. PATENT DOCUMENTS

| 557,799 | * | 4/1896 | Gorter ................... 239/587.3 |
| 1,599,907 |  | 9/1926 | MacGregor . |
| 1,665,810 | * | 4/1928 | Gillick ..................... 285/264 |
| 2,998,199 |  | 8/1961 | Miscovich . |
| 3,612,408 | * | 10/1971 | Holleman ............... 239/587.3 |
| 4,350,297 | * | 9/1982 | Martin ................... 239/587.4 |
| 4,392,618 |  | 7/1983 | Evans et al. . |
| 4,506,738 | * | 3/1985 | Evans et al. ............ 239/587.4 |
| 4,697,742 | * | 10/1987 | Schnipke .............. 239/587.4 |
| 4,793,557 |  | 12/1988 | Marchese et al. . |
| 5,249,632 | * | 10/1993 | Sparling et al. ......... 239/587.4 |

FOREIGN PATENT DOCUMENTS

| 1 104 275 | 6/1961 | (DE) . |
| G93 16 904.3 | 3/1994 | (DE) . |
| 43 38 662 | 5/1995 | (DE) . |

OTHER PUBLICATIONS

Akron Brass, Ozzie & Ladder Pipes, 1 pg.
Akron Brass, Ozzie™ Portable Oscillating Monitor, 4pgs., 1998.
Akron Brass, Ozzie—Style 911 to the Rescue!, 4 pgs., 1998.
Helitactics Limited, Sniper Attack Monitor, 1 pg., 1999.
PCT/ISA/220, International Search Report received Oct. 27, 2000, 8pgs.

* cited by examiner

Primary Examiner—David A. Scherbel
Assistant Examiner—Dinh Q. Nguyen
(74) Attorney, Agent, or Firm—Lathrop & Clark LLP

(57) ABSTRACT

A pivoting joint with a ball and socket joined by trunnions for use in fluid conduits, particularly firefighting devices such as portable monitors and the like. The pivoting joint can be used on an inlet of the device to provide a pivoting motion for one or more inlet hoses, and/or on the outlet of the device to direct the discharge in one or more directions. An optional one-way brake can be used to limit unintended movement about one or more axis of motion.

4 Claims, 5 Drawing Sheets

PIVOTING FLUID CONDUIT JOINT AND ONE-WAY BRAKE

FIELD AND BACKGROUND OF THE INVENTION

This invention relates generally to conduit swivels and more particularly to a ball and socket type pivot joint for use in lines where swiveling of the joint under pressure is required. A one-way brake can be fitted to the pivot joint to enable a heavy nozzle to be carried by the pivot joint without the nozzle's elevation being lowered by gravity.

Firefighting monitors are devices used to deliver large volumes of firefighting fluid such as water or foam. A monitor has an inlet that is connected to a feed hose or a pipe, and a discharge to which a nozzle is fitted. Some means is provided to vary the direction of the nozzle so that a stream of fire fighting fluid can be moved in both the horizontal and vertical directions.

Some existing monitors use ball and socket type swivels to accomplish movement in the horizontal and vertical directions. Ball and socket swivels have only a few parts and are simple to manufacture and maintain as compared to swivels that use ball bearings, for example.

Ball and socket swivels typically have very direct flow passages that can result in less pressure loss in the firefighting fluid flowing therethrough. Further, ball and socket swivels usually enable movement in all directions, but they generally have a more limited range of motion compared to ball bearing type swivels.

Typically in ball and socket swivels, the socket captures the ball so that internal pressure from the firefighting fluid does not separate the joint. The axial load due to the internal pressure is born by the ball/socket interface, which causes friction drag in the swivel during redirection. When the fluid pressure in the swivel is high, the axial force can be so great that redirecting the swivel is difficult, if not impossible.

To alleviate some of the friction drag, a ball and socket swivel with an axle passing completely through the joint is taught in U.S. Pat. No. 4,392,618. The axle bears the axial force from the water pressure thereby overcoming the high friction of a ball being pressed into a socket. Unfortunately, the presence of such an axle or other obstruction in the fluid conduit leads to turbulence and pressure loss in the fluid.

Regardless of the type of swivel used, portable monitors have never before had the ability for the hoses to enter the monitor by means of a swiveling joint, and for good reason. Reaction forces in a monitor are axially aligned with the direction of the discharge stream from the nozzle. When a portable monitor and hose are on a relatively flat support surface, the monitor is generally stable because the reaction forces plus the weight of the monitor keep the monitor in stable contact with the support surface.

The stability of a portable monitor becomes questionable when used on uneven surfaces. For example, if a portable monitor were set at the bottom of a flight of stairs, the feed hose going down the stairs into the monitor could cause the monitor inlet to tip upwards in alignment with the hose in response to the hose stiffening when fluid starts flowing.

Further, when ball and socket type swivel joints are used on a monitor discharge, the weight of the nozzle will redirect the discharge downward. Spring clutches on rotary valves are known, as in U.S. Pat. No. 3,940,107, but one-way brakes on pivoting conduit joints that permit an operator to easily redirect the nozzle are unknown. Thus, swivels on monitor outlets are problematic, as well.

Thus, an improved swivel is needed that does not have the above-described problems.

SUMMARY OF THE INVENTION

The present invention overcomes the problems associated with the prior art swivels by adding trunnions to convert the swivel to a pivoting joint without causing the turbulence of an axle running through the conduit. When used as an inlet, trunnions in the pivoting joint permit pivoting of the inlet about an axis defined by the trunnion and act to transfer lateral monitor reaction forces to feed hoses. Using such a pivoting inlet joint provides additional stability to portable monitors. Further, when used as an outlet, the pivoting joint of the present invention permits easier readjustment of a nozzle fitted on the outlet.

Thus, in accordance with the present invention there is provided a pivoting joint defining a fluid conduit therethrough. The pivoting joint includes a ball fitted into a mating socket, the ball and swivel being joined by at least one trunnion and, preferably, a pair of trunnions defining an axis. Carrying axial force on the trunnions as opposed to the ball and socket mating surfaces enables an operator to easily redirect the pivoting joint and its nozzle without the need to overcome the high internal torques generated in prior art ball and swivel joints, or the turbulence of an axle running through the conduit.

Also, when used as an outlet joint, the present invention typically includes a double ball and swivel combination. A trunnion or pair of trunnions that define an axis joins each ball and swivel combination. The axis of each ball and socket combination are oriented at ninety degrees to one another to allow the outlet pivoting joint to be reoriented in any direction relative to the monitor.

Typically, these outlet arrangements have one trunnion axis oriented horizontally to permit vertical pivoting of the joint. While necessary to permit vertical readjustment of the nozzle, the weight of the nozzle tends to pivot the joint downward. Thus, a one-way brake mechanism in accordance with the present invention is desirable to resist the downward force of the nozzle.

It is further desirable that the one-way brake include a release for easy movement when raising the nozzle. Ideally, the drag mechanism of the one-way brake is joined to the horizontal trunnion to resist unintended downward movement caused by the weight of a nozzle, but a second brake could be added to limit movement about the opposite axis. A one-way brake in accordance with the present invention can include a sleeve operably joined to the trunnion by bearing against a shoulder on the trunnion. A spring washer and nut provide axial load to push the sleeve into the shoulder on the trunnion. Thus, some amount of torque is needed to rotate the sleeve on the trunnion.

The sleeve is stepped and fitted into a cylindrical opening in a brake housing. Between the sleeves steps and the brake housing there is a tapered space. Inside each tapered space is disposed a small cylinder and a spring or resilient member to urge the small cylinder toward the narrow end of the tapered space. With such an arrangement, the pivoted joint can easily move in a direction that causes the small cylinders to move toward the large end of the tapered space. Yet movement that forces the small cylinder toward the small end of the tapered space jams the small cylinder and effectively locks the sleeve to the brake housing. A push downward by an operator can overcome the drag between the sleeve and the trunnion and reorient the outlet.

These and other benefits of the present invention will become apparent from the following detailed description of the drawings and the claims.

DETAILED DESCRIPTION OF THE DRAWINGS

Figure 1:
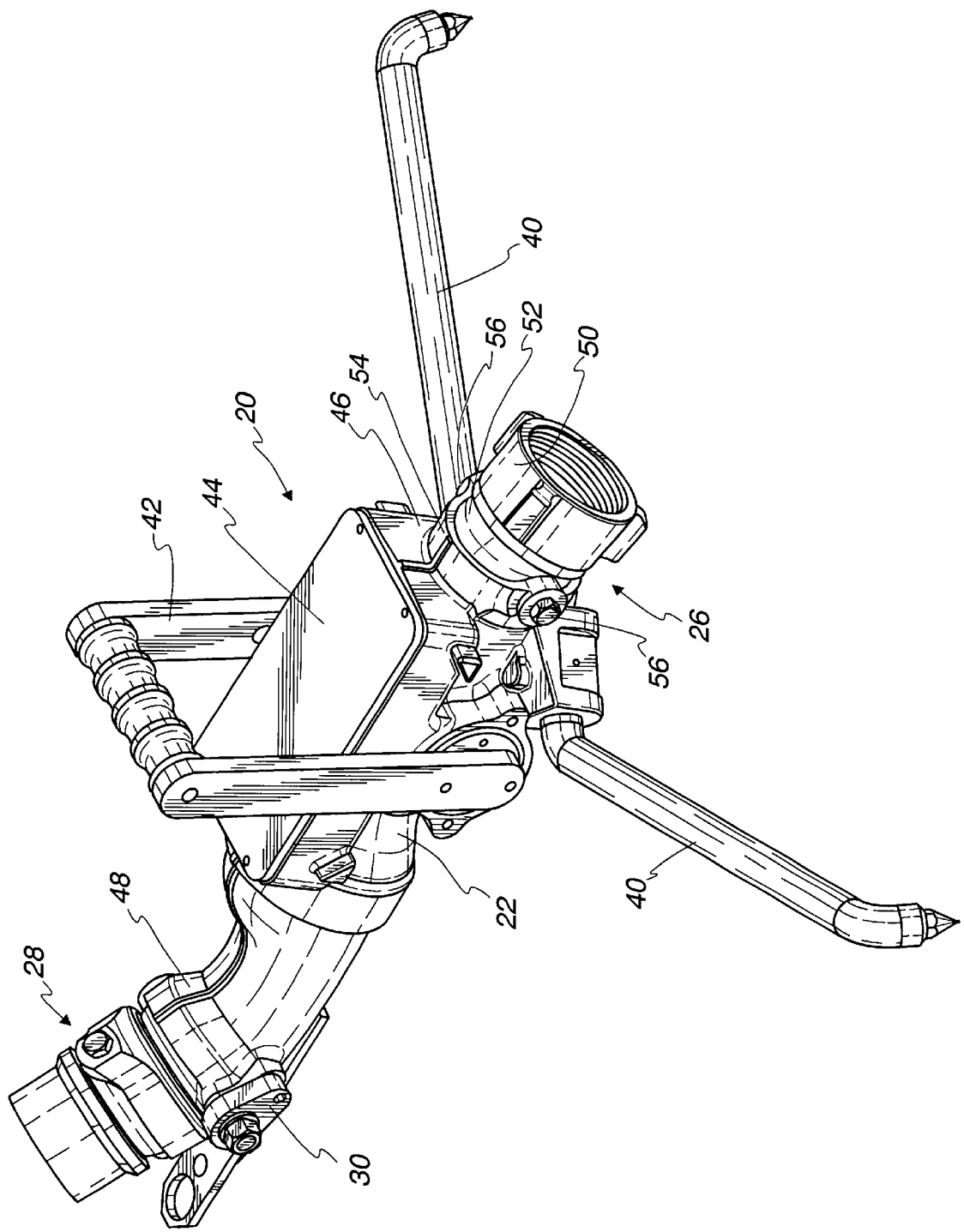
FIG. 1 is a perspective view of a monitor fitted with pivot joint inlets and outlets in accordance with the present invention.

In the following description of the drawings, the same reference numeral will be used to identify the same element in each of the drawings. Illustrated generally in FIG. 1 is a monitor 20 having a housing 22, a pivoting inlet joint 26, a pivoting outlet joint 28, and a one-way brake 30. The monitor housing 22 is depicted as a rigid pipe with spiked folding legs 40, a valve handle 42, and an emergency valve shut off mechanism 44. The folding legs 40 provide a broad base on which the monitor 20 reaction forces can be supported for stability. The valve handle 42 provides easy operation and direct control by the operator. The emergency valve shut off mechanism 44 automatically shuts off the monitor 20 in the event of sliding or tipping that would render further operation of the monitor 20 unsafe. Although the depicted monitor 20 is a preferred monitor shape and style due to its light weight and maneuverability, any monitor or piece of firefighting equipment can be used with the pivot joints of the present invention.

Figure 2:
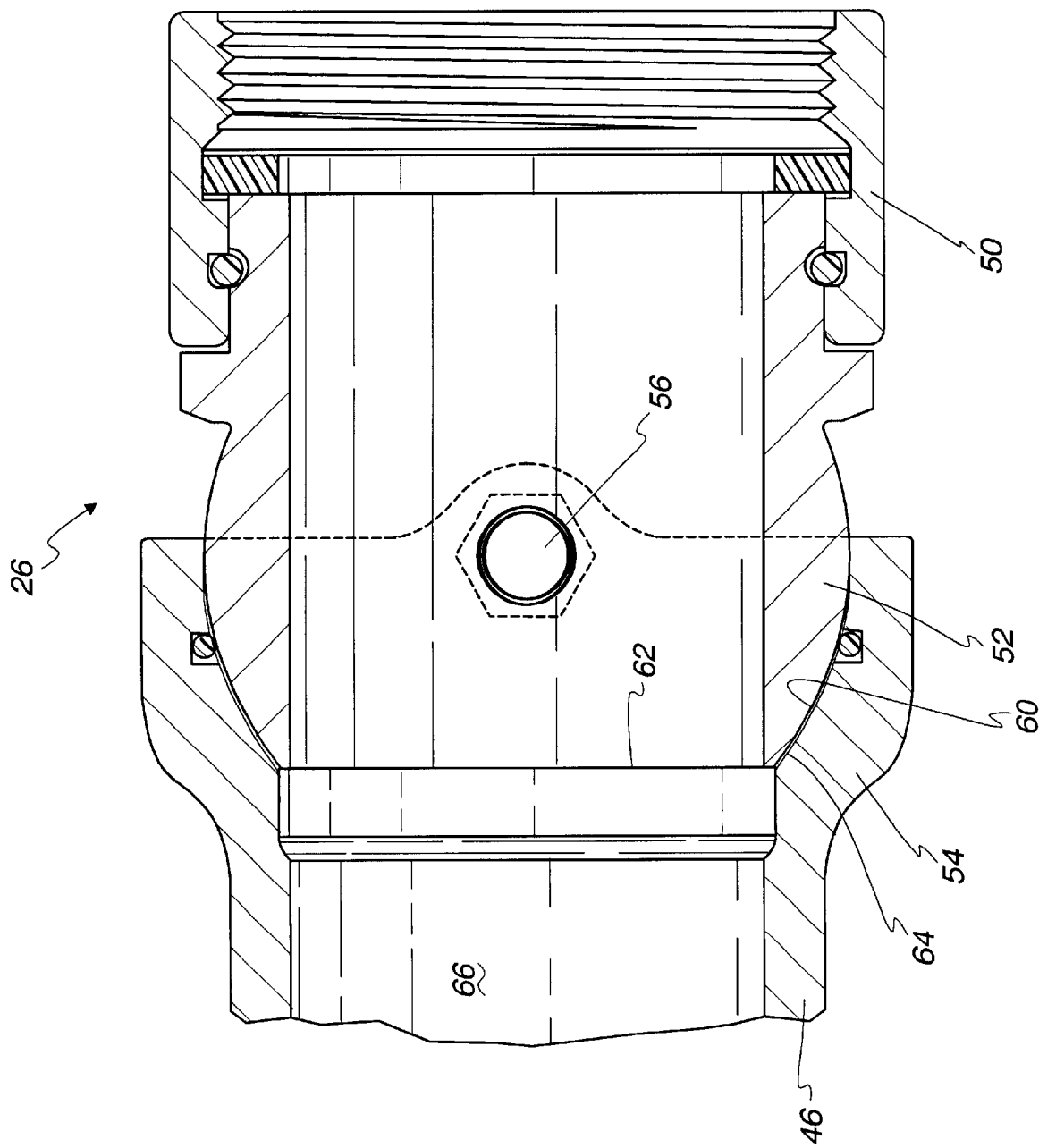
FIG. 2 is a cross-section of a single pivoting joint inlet in accordance with the present invention.

Also as depicted in FIGS. 1 and 2, the pivoting inlet 26 is positioned at an upstream end 46 of the monitor 20, while the pivoting outlet 28 is positioned at a downstream end 48 of the monitor 20. As best seen in FIG. 2, the pivoting inlet 26 includes a hose coupling 50, a ball 52, a socket 54, and a pair of trunnions 56. The hose coupling 50 can be of any type used in the firefighting industry including threaded couplings. The hose coupling 50 is at the extreme upstream end 46 of the pivoting inlet 26.

Immediately downstream from the hose coupling 50 is the ball 52 that can be formed integrally with or connected to the hose coupling 50. The ball 52 includes an outer spherically shaped surface 60 and defines an orifice 62 that is preferably centrally located on the ball 52.

Immediately downstream from the ball 52 is the socket 54, which defines an inner spherical surface 64 to mate with the outer spherical surface 60 of the ball 52. The socket 54 also defines an orifice 66 that cooperates with the ball orifice 62 to define a fluid conduit through the pivoting inlet 26. The ball 52 pivots in a vertical plane about an axis defined by the trunnions 56. Pivoting the ball 52 in the vertical plane is desirable because it reduces the tendency of the hose to lift up the monitor 20. Vertical swiveling only of the pivoting inlet 26 is preferred since horizontal swiveling could reduce the backwards reaction force which can be absorbed by the hose.

To successfully transfer nozzle reaction forces from the monitor 20 to a feed hose for added monitor stability, the downstream component of the pivoting inlet 26 must be fixed relative to the monitor 20, and the upstream component of the inlet pivot must be restricted in the ability to swivel relative to the fixed downstream component. In the illustrated example, the downstream component of the pivoting inlet 26 is the socket 54 which can be formed integrally with or joined to the monitor housing 22. The upstream component is the ball 52, which is prevented from full swivel movement by the trunnions 56.

Preferably, the pivoting inlet 26 trunnions 56 are oriented along a horizontal axis to permit pivoting movement in a vertical direction, but prevent pivoting in the horizontal direction. In this way, a feed hose can be aligned at various vertical angles relative to the monitor housing 22 such as when the monitor 20 is on a stair landing and the feed hose is on an adjacent staircase. This vertical adjustability is contrasted with the restriction of no horizontal adjustability, which provides stability to the monitor 20 when a nozzle is directed laterally away from the monitor 20, thus placing the reaction force dangerously close to or outside of the support plane defined by the monitor's legs 40. When this occurs, the feed hose will resist lateral movement of the monitor 20 and provide necessary stability.

Further, although depicted with the ball 56 upstream and the socket 54 downstream, the arrangement of the ball and socket is unimportant so long as the trunnions 56 are present to carry the axial load and restrict pivoting to the vertical plane.

The trunnions 56 are depicted as being screws that are threaded into the pivoting joint without extending substantially into the conduit. Nonetheless, any trunnion shape or size will work so long as it provides for relative pivoting movement between the ball and socket it connects and there is no significant obstruction of the conduit as compared to the axles of the prior art.

Figure 3:
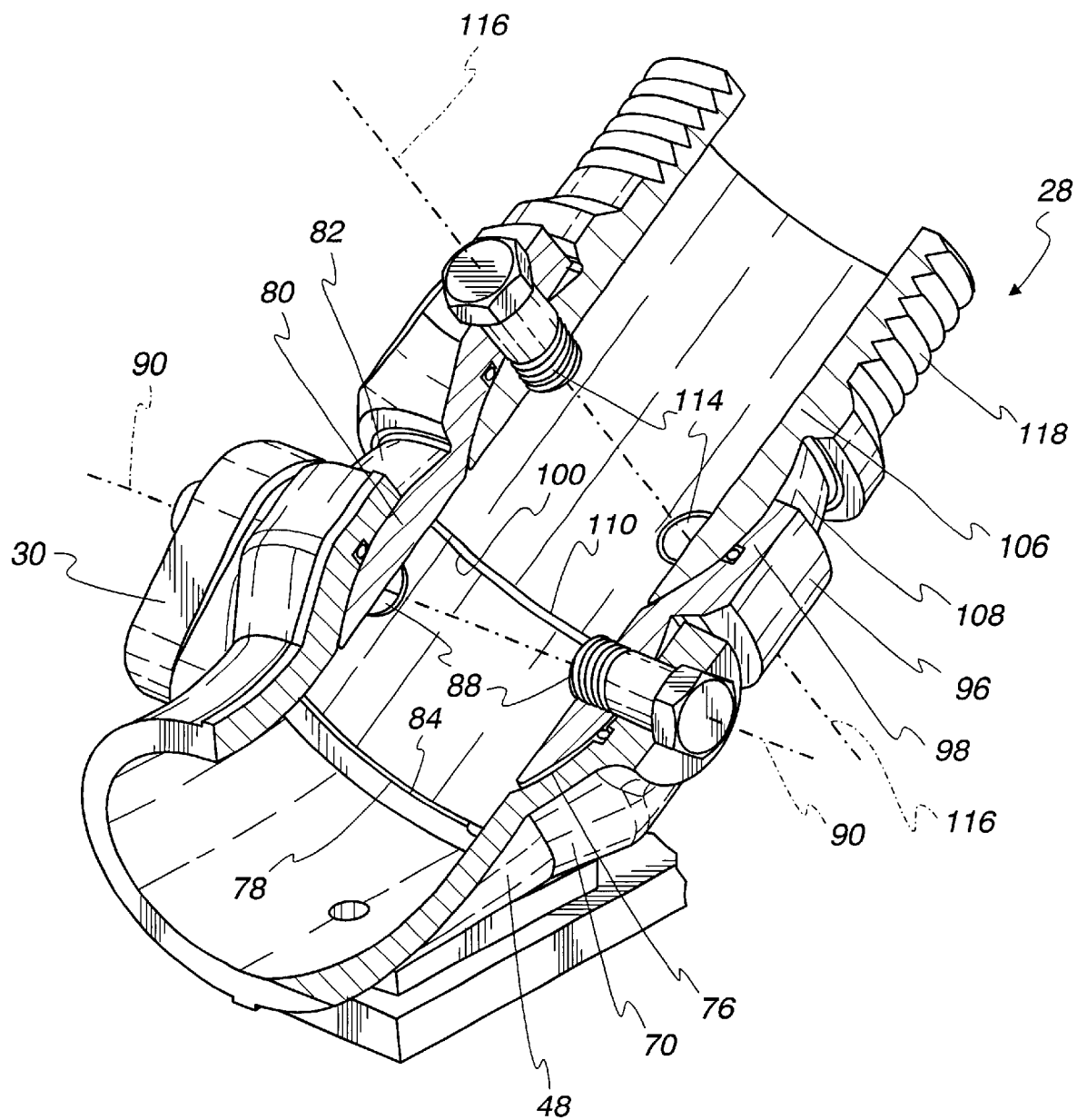
FIG. 3 is a cross-section of a double pivoting joint in accordance with the present invention.

As illustrated in FIG. 3, the pivoting outlet 28 includes at its upstream end, a first socket 70 that is either joined integrally with or fixed to the monitor housing 22 at the monitor downstream end 48. When fixed to the monitor housing 22, the first socket 70 can be threaded for ease of installation, maintenance, and repair. The first socket 70 includes an inner spherical surface 76 and defines an orifice 78 that is preferably centrally located on the first socket 70.

Immediately downstream of the first socket 70 there is a first ball 80 that has an outer spherical surface 82 that mates with the inner spherical surface 76 of the first socket 70. The first ball 80 defines an orifice 84 that aligns with the orifice 78 of the first socket 70 to define a fluid conduit.

The first socket 70 and the first ball 80 are joined for pivoting movement by a first pair of trunnions 88 aligned on a first axis 90. The trunnions 88 are preferably screws that fit in threaded holes and terminate shortly inside the first socket 70 to minimize turbulence.

Downstream from the first ball 80, there is a second socket 96 that is either formed integrally with or joined to the first ball 80 in some fixed relationship. The second socket 96 includes an inner spherical surface 98 and an orifice 100.

Downstream from the second socket 96, there is a second ball 106 having an outer spherical surface 108 and an orifice 110 that aligns with the second socket orifice 100, the first ball orifice 84, and the first socket orifice 78 to define a fluid conduit through the pivoting outlet 28.

The second socket 96 and the second ball 106 are joined by a second pair of trunnions 114 along a second axis 116 that is preferably oriented at a right angle to the first axis 90. This combination of balls, sockets, and trunnions permits the pivoting outlet 28 to pivot in all directions relative to the monitor housing 22 just as a prior art single ball and socket swivel except that the prior art swivel would be very difficult if not impossible to swivel under the axial loads experienced when fluid pressure in the monitor are high. By using two pairs of sockets and balls joined by trunnions, the same degree of reorientation is possible, but without the binding axial force. The only friction acting against pivoting reorientation of the outlet 28 is in the trunnions, therefore the torque due to friction is vastly reduced and, thus the present invention is usable where prior swivels are not. The threads of the trunnions 56, 88 and 114 are preferably fixed from threaded rotation by use of a high strength anaerobic adhesive such as made by the Loctite Corporation and sold under the trademark Loctite #271.

Downstream from the second ball 106 is a nozzle coupling 118 that is preferably threaded to receive a variety of nozzles. When a nozzle is fitted to the pivoting outlet 28, the nozzle's weight will force the outlet 28 to pivot downward. Obviously, unintended redirection of the nozzle is not desirable so the present invention is preferably fitted with a mechanism to resist unintended movement. The nozzle coupling 118 may also be connected to or integrally formed with any desired connector style, or be integrated with the nozzle inlet itself. It is to be understood that additional ball and socket combinations could be added to the above-described double ball and socket combinations to add additional range of motion in a pivoting connector.

Figure 4:
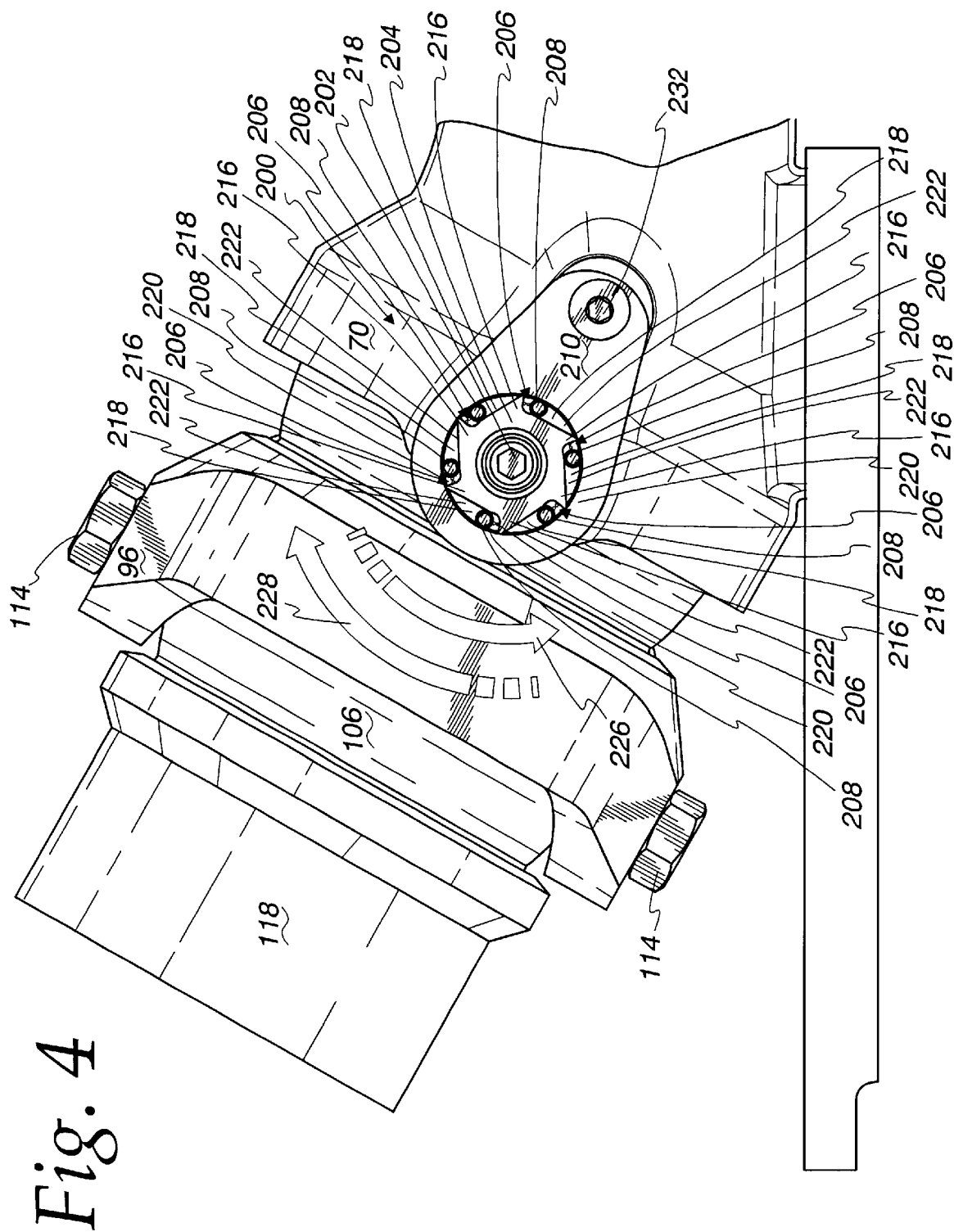
FIG. 4 is a double pivoting joint and one-way brake in accordance with the present invention.
Figure 5:
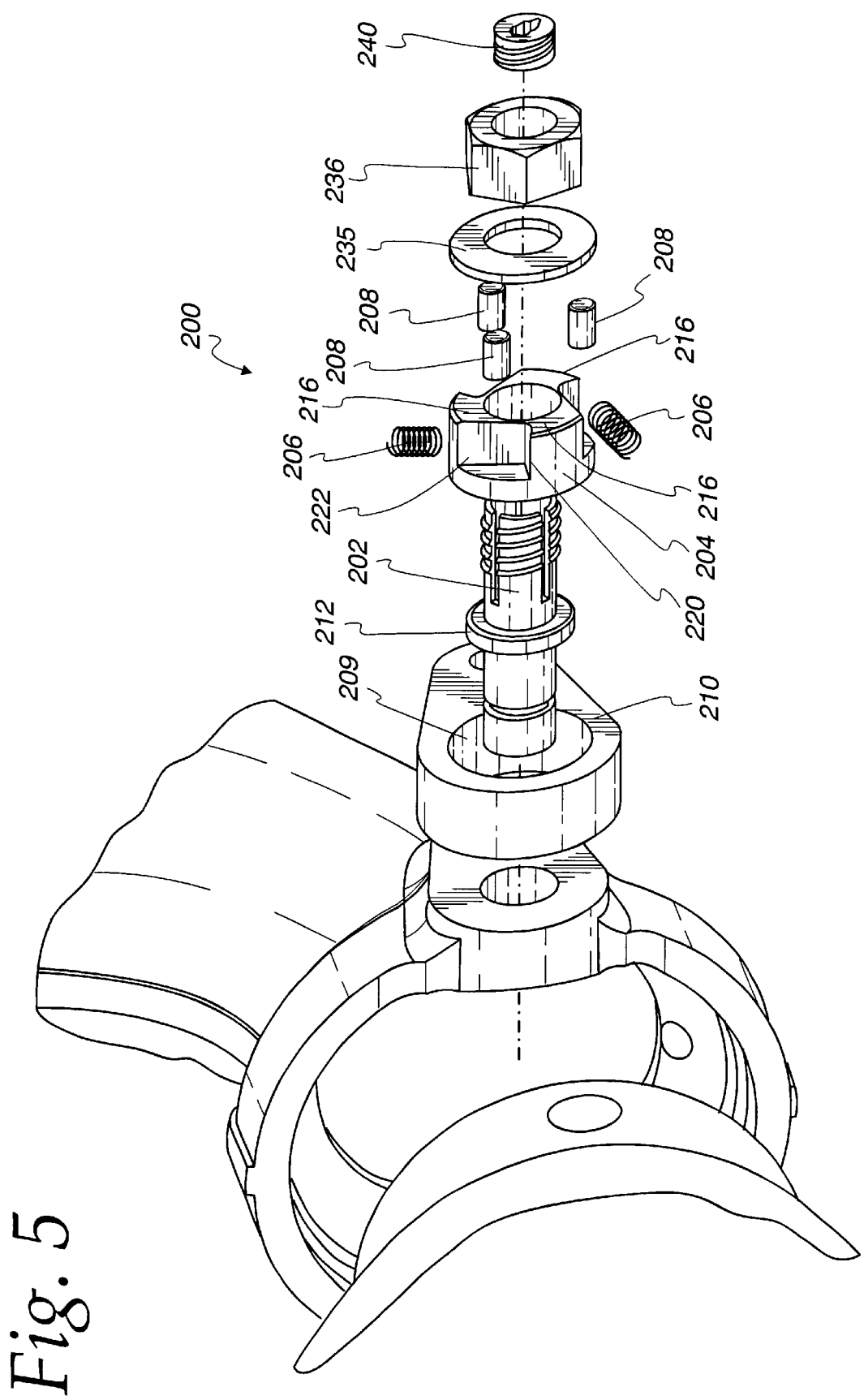
FIG. 5 is an exploded view of a one-way brake in accordance with the present invention.

As illustrated in FIGS. 4 and 5, there is a one-way brake 200 that restricts pivoting movement in one direction about an axis while permitting unrestricted movement in the opposite direction about the same axis. Thus, raising movement of the pivoting outlet 28 and its nozzle is not restricted, but a lowering movement of the nozzle is prevented unless intended by the firefighter. Although there is depicted only one one-way brake, a second one-way brake could be added to restrict movement about the other axis.

The one-way brake 200 includes: a trunnion 202, a sleeve 204 fitted to the trunnion 202, springs 206, cylinders 208, and a brake housing 210. The trunnion 202 can be any trunnion in either the pivoting inlet 26 or the pivoting outlet 28, but is preferably in the pivoting outlet 28 and horizontally oriented to resist nozzle weight. The trunnion 202 is fixed to either the ball or the socket of the pivoting joint, but in the illustrated example is fixed to the ball 80. A shoulder 212 is part of the trunnion 202 to provide a surface for the sleeve 204 to bear against.

The sleeve 204 is operable to engage the trunnion 202 due to a spring washer 235 and nut 236 that provide axial load to push the sleeve 204 into the shoulder 212 on the trunnion 202. This axial load provides rotational drag due to friction between the faces of the sleeve 204, the shoulder 212, and the spring washer 235. The position of the nut 236 is fixed by a tapered pipe plug 240 that is threaded into the trunnion 202. The trunnion 202 is slotted so that when the tapered pipe plug 240 is inserted, the trunnion 202 expands to fix the nut 236.

The sleeve 204 is shaped to provide steps 216 on which the springs 206 and cylinders 208 can act to resist unintended movement. The sleeve 204 can have as many steps 216 as necessary to resist expected loads and provide smooth one-way brake movement. As examples, the FIG. 4 embodiment illustrates six steps 216 and the FIG. 5 embodiment illustrates three steps 216. The sleeve 204 is disposed in a cylindrical opening 209 of the brake housing 210 and together with the sleeve steps 216 define tapered slots 218 having a wide end 220 and a narrow end 222.

Inside the tapered slots 218, the cylinders 208 and springs 206 are disposed, as illustrated in FIG. 4 with the springs 206 toward the slot wide ends 220 and the cylinders 208 toward the tapered slot narrow ends 222. In this manner, the springs 206 urge the cylinders 208 into the tapered slot narrow ends 222. Friction between the cylinders 208 and the brake housing 210 prevents the sleeve 204 from rotating relative to the brake housing 210, thereby preventing free rotation of the pivoting joint about the trunnion 202 in the locked direction 226. On the other hand, rotation in the unlocked direction 228 is possible because the cylinders 208 move toward the tapered slot wide end 220 where there is little or no friction between the cylinders 208 and the brake housing 210. The springs 206 may be of any type including compression, leaf, or preferably, elastometric tubing of silicone rubber material inserted along an axis parallel with the axis of the cylinders 208.

The weight of a nozzle causes the cylinders 208 to move toward the small end of the tapered space 222 and effectively lock the sleeve 204 to the brake housing 210. Friction between the sleeve 204, the trunnion 202, and the spring washer 236 support the weight of the nozzle. To lower the nozzle's elevation, an operator merely pushes down on the nozzle to overcome the friction between the sleeve 204 and the trunnion shoulder 212. To raise the nozzle, an operator pulls up on the nozzle causing the cylinders 208 to the wide end of the slot 220 thereby releasing the sleeve from the brake housing 210 and allowing the nozzle to move up without drag from the sleeve 204. Tapered slots 218 are preferably shaped to define a four degree pinch angle with a one inch diameter cylindrical opening 209, and the cylinders 208 are ⅛ of an inch in diameter.

The brake housing 210 is fixed to the opposite component of the pivoting joint to which the trunnion 202 is fixed. A simple crew 232 makes the connection.

The foregoing detailed description of drawings is provided for clearness of understanding only, and no unnecessary limitations therefrom should be read into the following claims.

What is claimed is:

1. A pivoting fluid conduit joint comprising:

a socket;

a ball disposed in the socket for movement relative to the socket; and a trunnion joining the ball and socket to permit relative pivoting movement between the ball and socket about an axis defined by the trunnion, wherein the trunnion is fixed to the ball, and a one-way brake, wherein the one-way brake comprises:

a stepped sleeve operable to engage the trunnion;

a brake housing fixed to the socket and defining a cylindrical opening for receiving the stepped sleeve, the brake housing and the stepped sleeve cooperate to define a tapered slot having a wide end and a narrow end;

a cylinder disposed in the tapered slot; and a spring disposed in the wide end of the tapered slot to urge the cylinder toward the narrow end of the tapered slot.

2. A pivoting fluid conduit joint comprising:

a socket;

a ball disposed in the socket for movement relative to the socket;

a trunnion joining the ball and socket to permit relative pivoting movement between the ball and socket about an axis defined by the trunnion, wherein the trunnion is fixed to the socket; and a one-way brake wherein the one-way brake comprises:

a stepped sleeve operable to engage the trunnion;

a brake housing fixed to the ball and defining a cylindrical opening for receiving the stepped sleeve, the brake housing and the stepped sleeve cooperate to define a tapered slot having a wide end and a narrow end;

a cylinder disposed in the tapered slot; and a spring disposed in the wide end of the tapered slot to urge the cylinder toward the narrow end of the tapered slot.

3. A pivoting fluid conduit joint defining a conduit, comprising:

a first socket;

a first ball disposed in the first socket and pivotably joined to the first socket along a first axis;

a second socket fixed to the first ball;

a second ball disposed in the second socket and pivotably joined to the second socket along a second axis oriented at a substantially right angle to the first axis;

a trunnion fixed to the first ball; and a brake for resisting pivoting movement of the first ball relative to the first socket, wherein the brake comprises:

a stepped sleeve operable to engage the trunnion;

a brake housing fixed to the socket and defining a cylindrical opening for receiving the stepped sleeve, the brake housing and the stepped sleeve cooperate to define a tapered slot having a wide end and a narrow end;

a cylinder disposed in the tapered slot; and a spring disposed in the wide end of the tapered slot to urge the cylinder toward the narrow end of the tapered slot.

4. A pivoting fluid conduit joint defining a conduit, comprising:

a first socket;

a first ball disposed in the first socket and pivotably joined to the first socket along a first axis;

a second socket fixed to the first ball; and a second ball disposed in the second socket and pivotably joined to the second socket along a second axis oriented at a substantially right angle to the first axis;

a trunnion fixed to the first socket, and a brake for resisting pivoting movement of the first ball relative to the first socket, wherein the brake comprises:

a stepped sleeve operable to engage the trunnion;

a brake housing fixed to the ball and defining a cylindrical opening for receiving the stepped sleeve, the brake housing and the stepped sleeve cooperate to define a tapered slot having a wide end and a narrow end;

a cylinder disposed in the tapered slot; and a spring disposed in the wide end of the tapered slot to urge the cylinder toward the narrow end of the tapered slot.

* * * * *